United States Patent [19]
Kim et al.

[11] Patent Number: 5,619,526
[45] Date of Patent: Apr. 8, 1997

[54] CDMA BASE STATION MODULATOR FOR DIGITAL CELLULAR MOBILE COMMUNICATION SYSTEMS

[75] Inventors: Jin U. Kim; Sun Y. Kim; Jeom D. Lee; Sung K. Lee, all of Daejeon, Rep. of Korea

[73] Assignee: Electronics and Telecommunications Research Institute, Daejeon, Rep. of Korea

[21] Appl. No.: 348,071

[22] Filed: Nov. 23, 1994

[30] Foreign Application Priority Data

Dec. 1, 1993 [KR] Rep. of Korea ............... 1993-26127

[51] Int. Cl.⁶ .............. H04K 1/02; H04J 11/00; H04J 13/00
[52] U.S. Cl. .............. 370/335; 375/208; 370/209
[58] Field of Search .............. 375/205, 208, 375/279, 281, 308, 229; 370/18, 22, 19; 327/164; 379/58; 455/33.1; 332/103

[56] References Cited

U.S. PATENT DOCUMENTS

| | | | |
|---|---|---|---|
| 5,235,614 | 8/1993 | Bruckert et al. | 375/205 |
| 5,291,515 | 3/1994 | Uchida et al. | 370/18 |
| 5,373,502 | 12/1994 | Turban | 370/18 |
| 5,406,629 | 4/1995 | Harrison et al. | 375/205 |
| 5,416,797 | 5/1995 | Gilhousen et al. | 375/205 |
| 5,442,625 | 8/1995 | Gitlin et al. | 370/18 |
| 5,465,269 | 11/1995 | Schnoffner et al. | 375/205 |
| 5,471,497 | 11/1995 | Zehavi | 375/200 |

OTHER PUBLICATIONS

"Modulator ASIC", *Qualcomm Proprietary*, Aug. 5, 1991, pp. 27–43.

*Primary Examiner*—Tesfaldet Bocure
*Attorney, Agent, or Firm*—Spencer & Frank

[57] ABSTRACT

A base station modulator for the digital cellular mobile communication system achieves reduced hardware complexity in a base band QPSK modulating circuit by applying the Multilevel Logic Operation (MLO) which is extended from the conventional binary exclusive-OR operation, to the conventional Base Station Modulator (BSM). The base station modulator includes a plurality of spreaders 621 for QPSK spreading of a voice data stream. These spreaders 621 employ binary-multilevel Logic (MLO) gates instead of multiple binary exclusive-OR gates. The binary-multilevel Logic gate includes a subtractor 510 and a selector 520. The subtractor has one input (−) to which multilevel logic values are applied and one input (+) to which a maximum logic level of the multilevel logic values is applied. The selector has one input to which the multilevel logic values are applied, one input to which the output signal of the subtractor 510 is applied, and one control input to which the binary logic value is applied. If the binary logic value is zero (0), the selector 520 selects and outputs the multilevel logic values, and if the binary logic value is one (1), the selector 520 selects and outputs the output signal from the subtractor 510.

11 Claims, 6 Drawing Sheets

CDMA BASE STATION MODULATOR FOR DIGITAL CELLULAR MOBILE COMMUNICATION SYSTEMS

FIELD OF THE INVENTION

This invention relates to a Code Division Multiple Access (CDMA) base station modulator for digital cellular mobile communication systems.

BACKGROUND OF THE INVENTION

We have recognized that Code Division Multiple Access (CDMA) is an efficient technique of using the frequency resource for mobile radio systems. It draws much attention from people in the digital cellular communications area for its large capacity and seamless handoff. In this paper, we define the Multilevel Logic Operation (MLO) which is extended from the conventional binary exclusive OR logic operation. We then apply this MLO to the CDMA Base Station Modulator (BSM) design to reduce the hardware complexity.

A block diagram of a conventional 3-sectorized Base Station Modulator (BSM) which has been developed by Qualcomm Inc. is shown in FIG. 1. In this figure, voice data are encoded by a Vocoder (Voice Coder) and convolutionally encoded via a rate ½ convolutional encoder 101 in a channel encoder and scrambler block 100. And then, the coded symbols are interleaved by a block interleaver 102 in order to increase the immunity against burst errors, which frequently occur in a mobile radio environment. These interleaved symbols are scrambled by a long code PN (Pseudorandom Noise) scrambler 103. The scrambled symbols are then pseudorandomly punctured with the cycle of 800 Hz and substituted with power control bit supplied via the microprocessor interface in a puncture control 104 (See, EIA/TIA, IS-95, "Mobile Station-Base Station Compatibility Standard for Dual-mode Wideband Spread Spectrum Cellular System" U.S., July 1993.). The symbol stream is then covered by a Walsh sequence cover 111 within a base band QPSK (Quaternary Phase Shift Keying) modulator block 110, with a distinct Walsh sequence selected via the microprocessor interface. In here, 64-ary Walsh symbols are used and one Walsh code is only assigned to any one user. Forward channels from base station to mobile station are differentiated and identified by Walsh code. Two forward channels transmitting symbol streams are thus formed, corresponding to the two transmit sections. Two forward transmit channels are required to support the softer handoff, which is defined as a handoff occuring among two sectors without temporary disconnection of the call. The Walsh covering guarantees orthogonality between various users in the same CDMA radio channel. After Walsh covering, the symbols are QPSK spreaded in a spreader 114 with two (I and Q channels) PN sequences generated by a Pilot PN generators 112 and 113 respectively. One sequence is used to form an in-phase QPSK channel, and the other PN sequence is used to generate a quadrature-phase channel. Shifted versions of the two basic sequences (which are common to all forward channels) are used to differentiate sectors/cells. After spreading, chip signals are low pass filtered by 48 tab FIR (Finite Impulse Response) filters 115 (See, EIA/TIA, IS-95, "Mobile Station-Base Station Compatibility Standard for Dual-mode Wideband Spread Spectrum Cellular System" U.S., July 1993.). The filtering limits the bandwidth of the transmitted signals, as required to limit interference with adjacent CDMA radio channels. Before filtering, the chip signals are scaled according to their associated rate information. The filters 115 smooth the transitions between symbols with different bit rates. After filtering, the transmit waveforms are scaled to provide power control in the forward channel. The scaling factor is supplied via the microprocessor interface. The BSM provides output to three base station sectors. Each output may be programmed via the processor interface to provide multiplexed I and Q from either of the two transmit sections. The outputs may also be programmed to provide the sum of the two transmit sections as multiplexed I and Q.

There are 192 multiplexed I and Q signals in a 3-sectorized (Alpha, Beta and Gamma sectors) cell. These 64 multiplexed I and Q signals per each sector are combined digitally via digital combiners 130 and converted to analog signals in D/A converters 131. And then, these analog signals are demultiplexed and modulated with the carrier frequency. The modulated I and Q signals are filtered through Low Pass Filters (LPF) 133 and summed before transmitted in summing circuits 134.

As described above, the information bits are spreaded with the PN sequences in the CDMA communications systems. The spreader 114 and long code PN scrambler (103) can be implemented with binary exclusive-OR logic gates since the two inputs of this spreader have binary logic values. However, if the input logic of these gates is not binary, we cannot use these binary logic gates any more. Therefore, extending the binary logic gate to a multilevel logic gate makes digital logic circuit design easier and simpler. Accordingly, to improve the complexity of the digital logic circuit, it is required to define Multilevel Logic Operation, especially multilevel logic exclusive OR operation, extended from the binary exclusive-OR operation and to apply it to the circuit design.

SUMMARY OF THE INVENTION

Therefore, one object of the invention is to apply the multilevel logic operation to a base band QPSK modulating circuit for the CDMA cellular mobile communication system.

It is another object of the invention to construct a base station modulator for the digital cellular mobile communication system having reduced hardware complexity by means of the base band QPSK modulating circuit.

According to the present invention, a base band Quaternary Phase Shift Keying (QPSK) modulating circuit in a CDMA digital mobile communication system which includes a summing means for summing a plurality of Walsh covered signals from a plurality of Walsh sequence covers and a Pilot pseudorandom noise sequence generator, comprises: a binary-multilevel Exclusive-ORing means for Exclusive-ORing the multilevel outputs from said summing means and Pilot PN sequences from the Pilot PN sequence generator; and a finite impulse response (FIR) filtering means, connected to the binary-multilevel Exclusive-ORing means, for FIR filtering the output signal of the binary-multilevel Exclusive-ORing means.

Also in accordance with the present invention, a base band modulator for a CDMA digital mobile communication system comprises: a channel encoder and scrambler means for encoding voice data supplied via a microprocessor interface and for scrambling them with a long code pseudorandom noise sequence; a switching means, connected to the channel encoder and scrambler means, for switching the voice data into three base station sectors under control of a base station controller; a plurality of Walsh sequence covers, connected to the switching means, for covering the voice data with a Walsh sequence; a summing means for summing a plurality of Walsh covered data from the plurality of Walsh sequence covers; and a base band Quaternary Phase Shift Keying (QPSK) modulating circuit for QPSK spreading the output data of the summing means and modulating them with carrier frequencies.

These and other objects and advantages of the invention will be apparent from the following detailed description with reference to the accompanying drawings.

BRIEF DESCRIPTION OF THE INVENTION

DETAILED DESCRIPTION OF THE INVENTION

The truth table for the binary exclusive-OR logic gate is shown in Table 1. In this table, logic value 1 or 0 can be mapped to real −1 or +1, respectively. But, in the case that two inputs of the exclusive OR operator are not binary logic values, such exclusive-OR logic operation can not be used. Accordingly, in order to solve this problem, we define the Multilevel Logic Operation, whose any one of two inputs has a multilevel logic value. We can get the truth table for the binary-multilevel exclusive-OR operation as shown is Table 2. In the table 2, ⊞ denotes the binary-multilevel exclusive-OR operation, and /R denotes the (radix−1)'s complement of R. For example, in an (A+1)-ary input, A+1 is the radix of the input logic.

$$/R = A - R \quad (1)$$

Figure 4A:
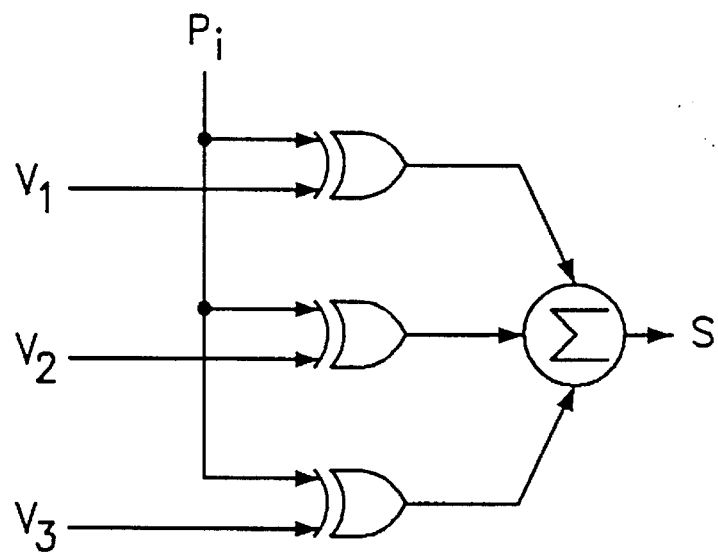
FIGS. 4A and 4B illustrate equivalent circuits of a Binary exclusive-OR operator and a Binary-Multilevel exclusive-OR operator, respectively.
Figure 4B:
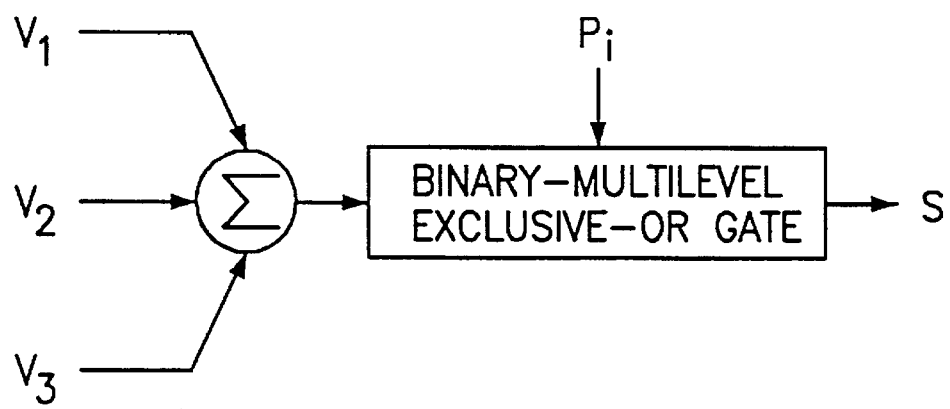

In order to examine the efficiency of the defined binary-multilevel exclusive-OR logic operation, consider two logic circuits which are shown in FIG. 4A and 4B. The circuit of FIG. 4A performs the following function $$S = (Pi \oplus V1) + (Pi \oplus V2) + (Pi \oplus V3) \quad (2)$$

where V1, V2, V3 and Pi are binary logic signals, and ⊕ denotes the binary exclusive-OR operation.

Figure 5:
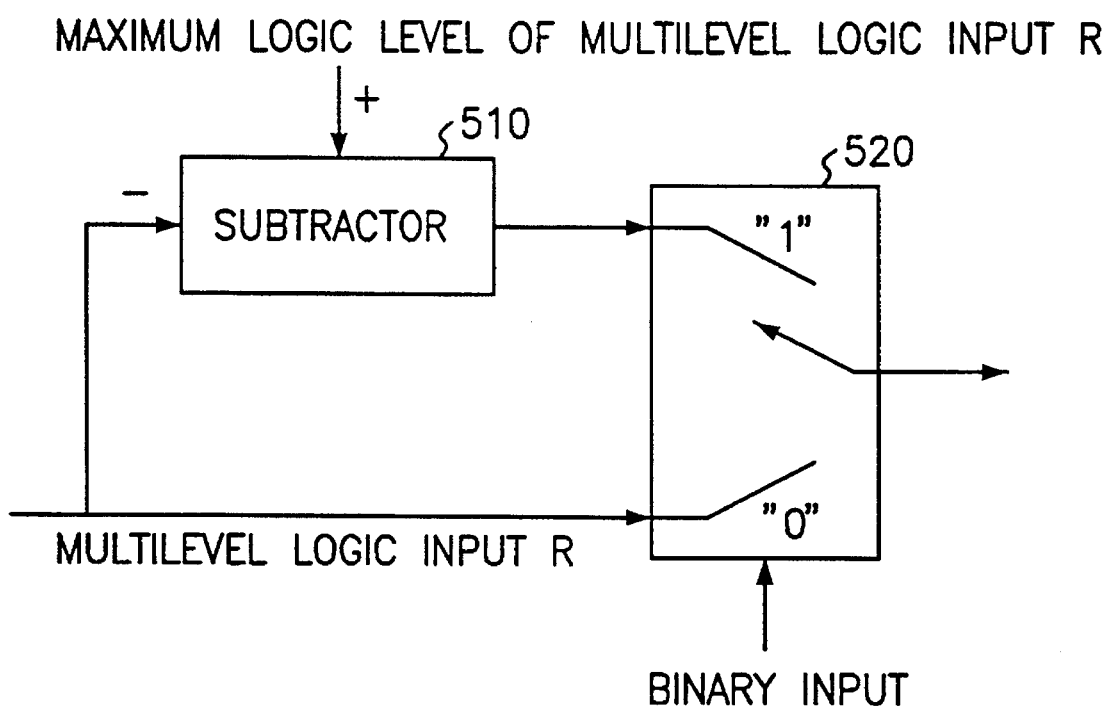
FIG. 5 illustrates one embodiment of a Binary-Multilevel exclusive-OR operator according to the present invention.

Since the binary exclusive-OR operation is a linear operation, we apply the distributive law to the above equation to obtain the following equation:

$$S = Pi \boxplus (V1 + V2 + V3) \quad (3)$$

where ⊞, which has a binary logic value as the LHS (left hand side of the operator: Pi) input and multilevel logic value as the RHS (right hand side of the operator: V1+V2+V3) input of it, denotes the binary-multilevel exclusive-OR logic operation defined on Table 2. This extended binary-multilevel exclusive OR operator can be easily implemented as shown in FIG. 5.

TABLE 1

| Truth table for binary exclusive-OR operation | | |
|---|---|---|
| ⊕ | 0 | 1 |
| 0 | 0 | 1 |
| 1 | 1 | 0 |

TABLE 2

| Truth table for binary-multilevel exclusive-OR operation | |
|---|---|
| ⊞ | R |
| 0 | R |
| 1 | /R |

Therefore, the circuit of FIG. 4B performs the same function as FIG. 4A. For example, assuming that V1=(1.00110101), V2=(011001010), V3=(110101100), and Pi=(010110010), both circuits of the FIG. 4A and 4B output the same result (211122221).

The binary-multilevel exclusive-OR operator we defined is linear, however, it is not commutative since the one input logic of the operator is not equal to the other input logic. Commutativity holds only when two inputs have the same logic values.

Since sum of the multiple binary exclusive-OR operation can be converted into the single binary-muitilevel exclusive-OR operation by using the defined truth table, we can implement the same function using only one binary-multilevel exclusive-OR operator instead of multiple binary exclusive-OR operators in the above example.

Figure 1:
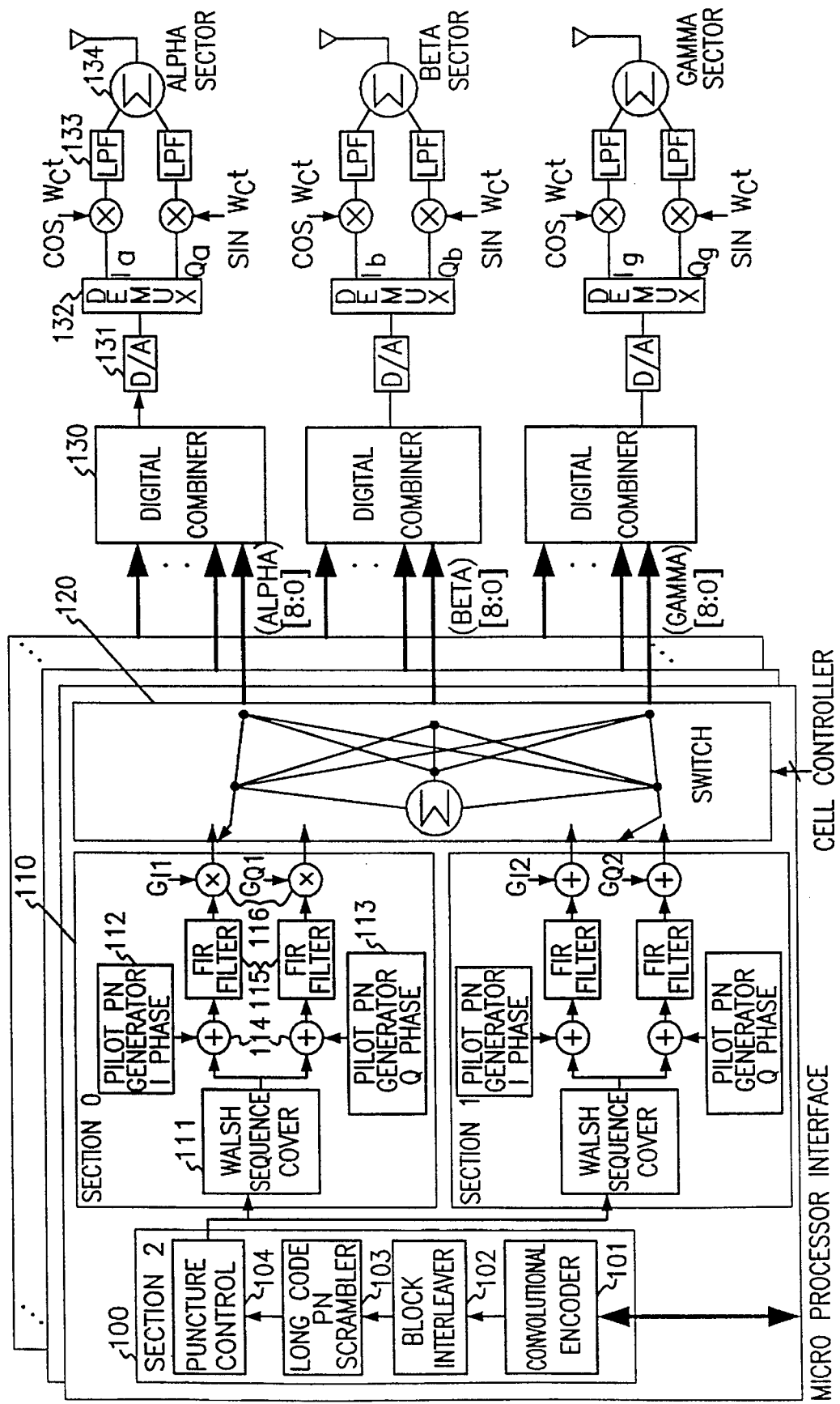
FIG. 1 is a block diagram of a conventional CDMA base station modulator.
Figure 2:
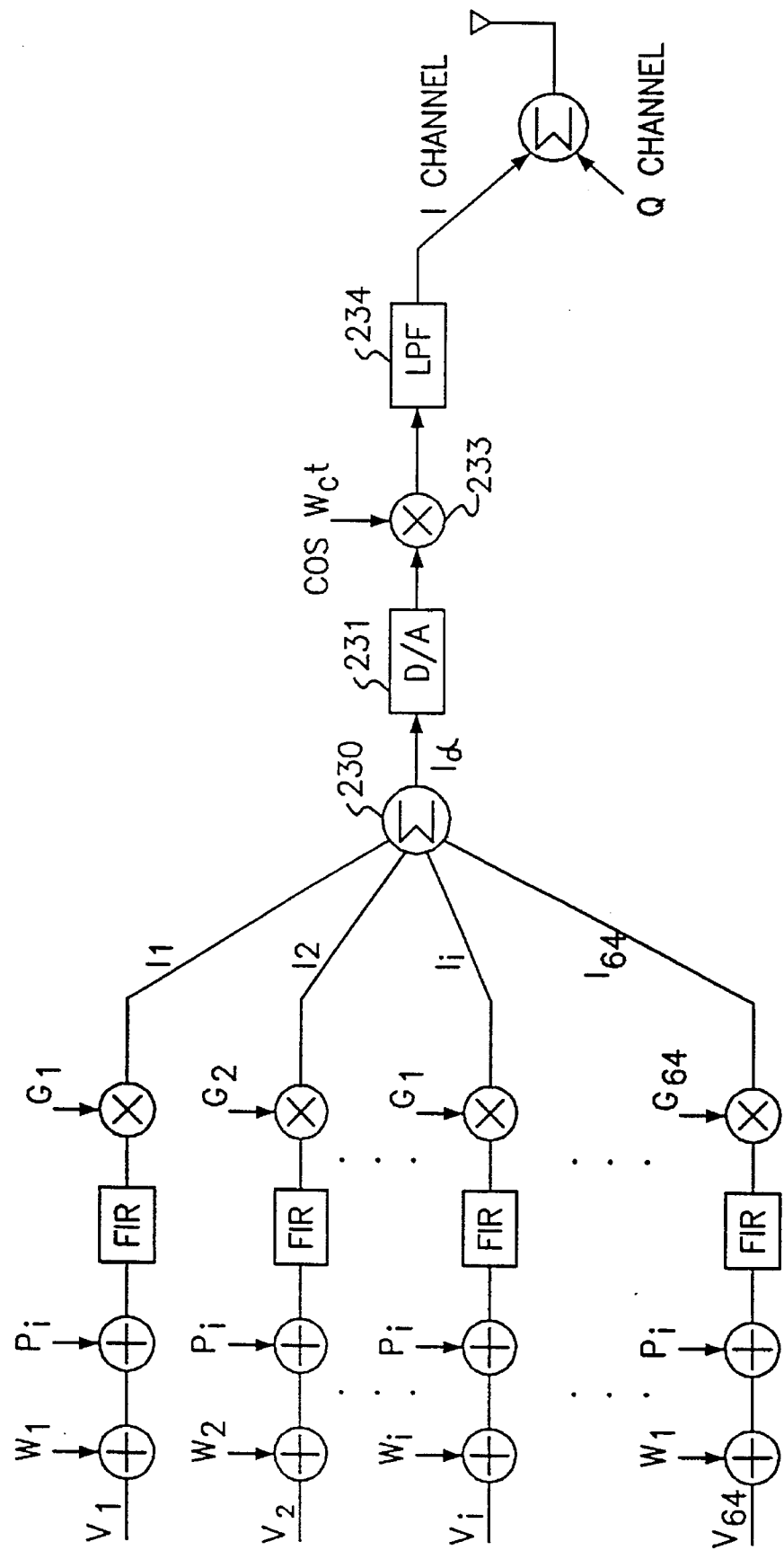
FIG. 2 illustrates a I-channel signal flow in an Alpha sector of the conventional CDMA base station modulator.

In order to apply the MLO to the conventional BSM, consider the structure of the 3-sectorized BSM shown in FIG. 1. In this figure, we can extract only the data flow of the I-channel signal of the alpha sector as shown in FIG. 2, where Vi denotes power punctured signals to be transmitted to i-th user. Then, the signal Ia at the output of digital combiner 230 is $$Ia = \sum_{i=1}^{N} Gi \, FIR\{(Vi \oplus Wi) \oplus Pi\} \quad (4)$$

where, Gi denotes a gain factor of the signal to the i-th user, Pi denotes the I-channel PN spreading sequence, Wi denotes the Walsh code assigned to i-th user, N is the total number of users in the alpha sector, and FIR means a FIR filtering. Similarly the Q-channel signal Qa at the output of digital combiner 230 is $$Qa = \sum_{i=1}^{N} Gi \, FIR\{(Vi \oplus Wi) \oplus Pq\} \quad (5)$$

where Pq is a Q-channel PN spreading sequence.

Using the linearity of the operators in the equations (4) and (5), we can get the following equations.

$$Ia = FIR \left\{ Pi \boxplus \sum_{i=1}^{N} (Vi \oplus Wi) \right\} \quad (6)$$

$$Qa = FIR \left\{ Pg \boxplus \sum_{i=1}^{N} (Vi \oplus Wi) \right\} \quad (7)$$

Figure 3:
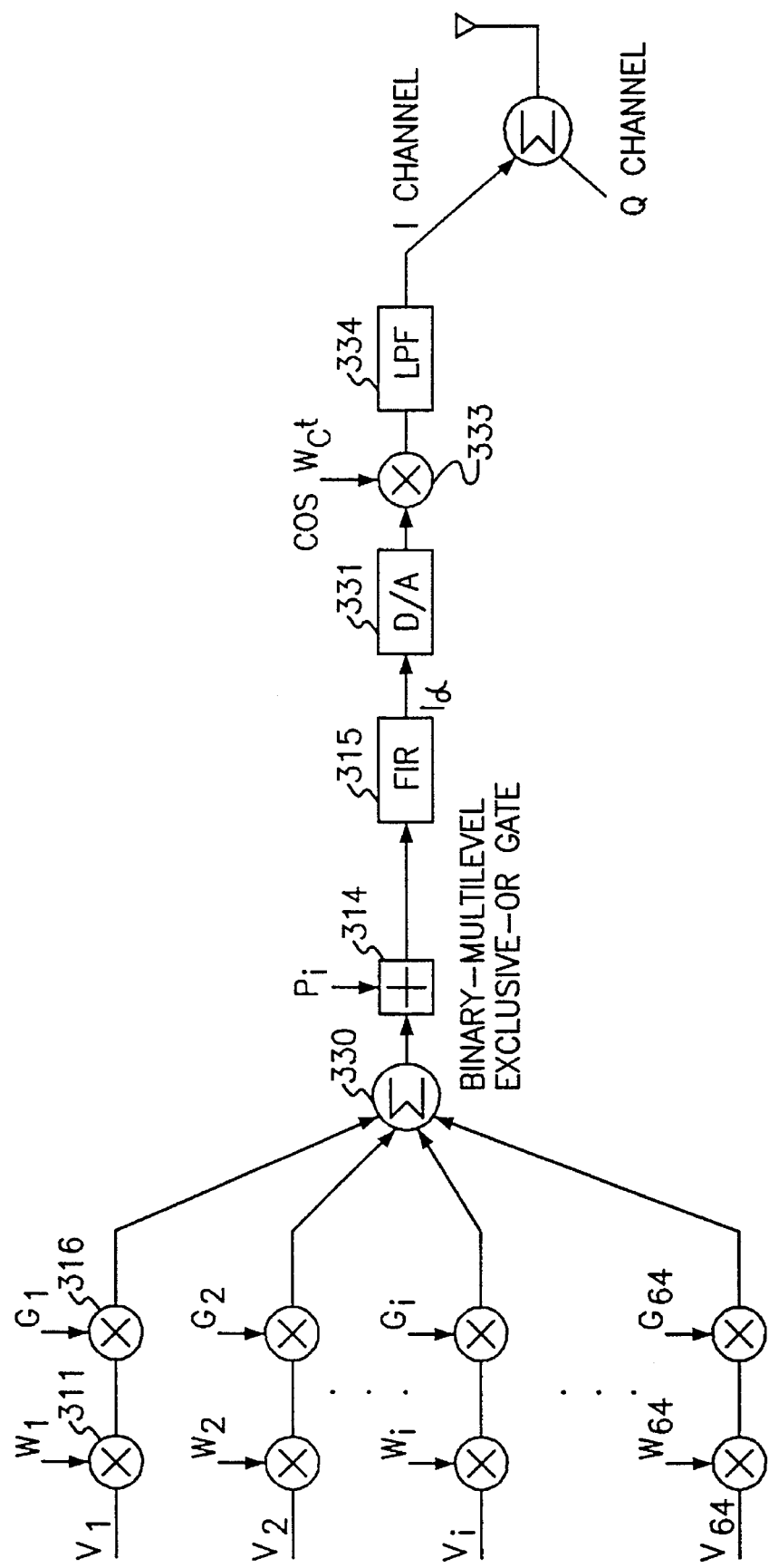
FIG. 3 illustrates a I-channel signal flow in an Alpha sector of a CDMA base station modulator according to the present invention.

The signal Ia of the equation (6) can be simply implemented by a base band modulating circuit as shown in FIG. 3. Referring to FIG. 3, the base band modulating circuit comprises a digital combiner 330 for summing a plurality of Walsh covered signals from the plurality of Walsh sequence covers 311; a spreader 314, connected to the digital combiner 330, for spreading the output signal from the digital combiner 330 with the Pilot PN signal Pi; and a finite impulse response (FIR) filter 315, connected to the spreader 314, for filtering the output signal from the spreader 314. Here, the spreader 314 can be implemented by a binary-multilevel Exclusive-OR operator as shown in FIG. 5. In this figure, the binary-multilevel Exclusive-OR operator includes a subtractor 510 and a selector 520. The subtractor has one input (−) to which multilevel logic values are applied and one input (+) to which a maximum logic level of the multilevel logic values is applied, and performs a subtraction of the two input signals being applied to its two input. The selector has one input to which the multilevel logic values are applied, one input to which the output signal of the subtractor 510 and is applied, one control input to which the binary logic value is applied, and which selects and outputs one of the multilevel logic values and the output signal from the subtractor 510, depending on the binary logic value. For example, if the binary logic value is zero (0), the selector 520 selects and outputs the multilevel logic values, and if the binary logic value is one (1), the selector 520 selects and outputs the output signal from the subtractor 510. As will be apparent from FIG. 2 and FIG. 3, the logic circuit of FIG. 3 has a smaller number of FIR filters and spreaders than the logic circuit in FIG. 2.

Figure 6:
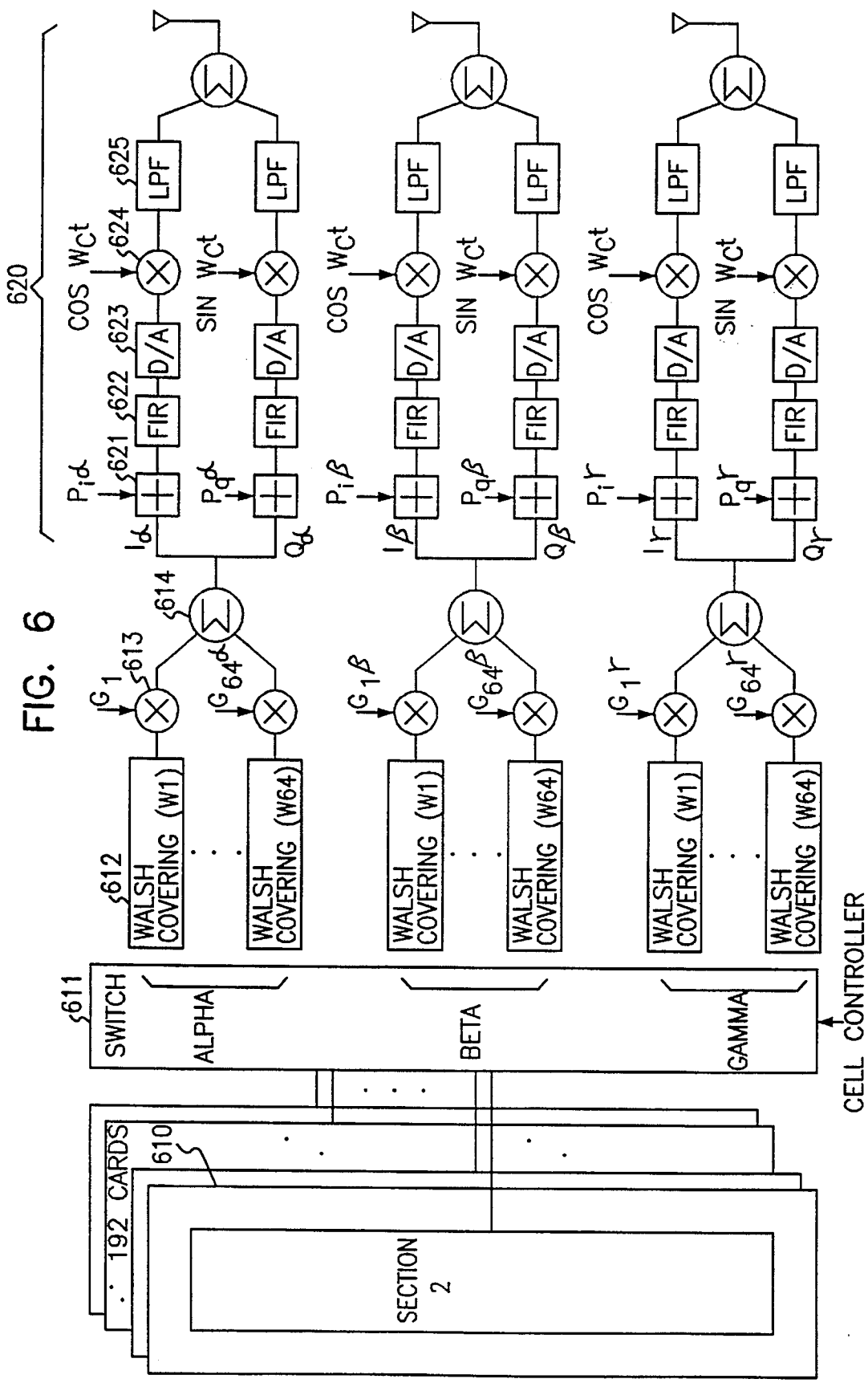
FIG. 6 is a block diagram of a CDMA base station modulator according to the present invention.

Now we can apply the MLO to the conventional BSM based on circuit transform from FIG. 2 to FIG. 3. The conventional BSM structure shown in FIG. 1 can be converted into the simpler structure of the BSM as shown in FIG. 6. Referring now to FIG. 6, showing a block diagram of a CDMA base station modulator according to the present invention, the modulator comprises a channel encoder and scrambler block 610, a switch 611; a Walsh sequence cover block 612, a amplifier block 613, a summer or combiner block 614, and a base band Quaternary Phase Shift Keying (QPSK) modulating circuit block 620. The channel encoder and scrambler block 610 performs the same function as that of the channel encoder and scrambler block 100 of FIG. 1. Then, the encoded and scrambled voice data stream from the block 610 is branched into any one or two of the three sectors selected by a base station controller (not shown). The branched stream is covered by the Walsh sequence cover block 612 with Walsh sequence (W1 . . . W64), and amplified by the amplifier block 613, and then summed by the digital combiner block 614. The base band Quaternary Phase Shift Keying (QPSK) modulating circuit block 620 includes a plurality of spreaders 621, a plurality of FIR filters 622, a plurality of digital/analog converters 623, a plurality of carrier frequency modulators 624, a plurality of low pass filters 625, and a plurality of summers. The summed data stream is QPSK spreaded via two (I and Q channels) PN sequences by the plurality of spreaders 621. These spreaders may be the binary-multilevel Exclusive-OR operators as shown in FIG. 5. After spreading, the data stream is FIR filtered and converted into analog signals. And then, these analog signals are modulated with the carrier frequency in the modulators 624. The modulated I and Q signals are filtered through the low pass filters 625 and summed before transmitted.

As will be apparent from FIGS. 1 and 6, the circuit shown in FIG. 6 has only 6 FIR filters, 6 spreaders, and 3N Walsh covers, while the conventional BSM structure has 12N FIR filters, 12N spreaders, and 6N Walsh covers. For example, when it uses the 64-ary Walsh cover, N becomes 64. Thus the circuit shown in FIG. 6 comprises 6 FIR filters, 6 spreaders, and 192 Walsh covers while the conventional BSM comprises 768 FIR filters, 768 spreaders, and 384 Walsh covers. Hence the complexity of the new structure is reduced to less than 1% for the spreaders and FIR filters, and 50% for Walsh covering, compared with the conventional CDMA BSM.

And also, this new structure can be implemented more easily than the conventional BSM structure because it requires relatively low speed digital combining.

The invention has been described in detail with respect to an embodiment, and it will now be apparent from the foregoing to those skilled in the art that changes and modifications may be made without departing from the spirit of the invention in its broader aspects, and it is the intention, therefore, in the appended claims to cover all such changes and modifications as fall within the true spirit of the invention.

We claim:

1. A base band Quaternary Phase Shift Keying (QPSK) modulating circuit in a CDMA digital mobile communication system which includes a summing means for summing a plurality of Walsh covered signals from a plurality of Walsh sequence covers and a Pilot pseudorandom noise sequence generator, comprising:

a binary-multilevel Exclusive-ORing means for Exclusive-ORing multilevel outputs from said summing means and Pilot PN sequences from the Pilot PN sequence generator; and a finite impulse response (FIR) filtering means, connected to the binary-multilevel Exclusive-ORing means, for FIR filtering the output signals of the binary-multilevel Exclusive-ORing means.

2. A base band Quaternary Phase Shift Keying modulating circuit according to claim 1, wherein the binary-multilevel Exclusive-ORing means includes:

a subtractor means having one input to which the multilevel outputs from the summing means are applied and one input to which a maximum logic level of the multilevel outputs is applied; and a selecting means having one input to which the multilevel outputs from the summing means are applied, one input to which the output signal of the subtractor means is applied, and one input to which a binary logic value from the Pilot PN sequence generator is applied, and which selects and outputs one of the multilevel outputs from the summing means and the output signal from the subtractor means, depending on the binary logic value from the Pilot PN sequence generator.

3. A base band Quaternary Phase Shift Keying modulating circuit according to claim 2, wherein the selecting means includes an electronic control switch having said control input to which a binary logic value is applied.

4. A base band Quaternary Phase Shift Keying modulating circuit according to claim 2, wherein the selecting means includes a 2:1 multiplexer.

5. A base band modulator for a CDMA digital mobile communication system, comprising:

a channel encoder and scrambler means for encoding voice data supplied via a microprocessor interfere and for scrambling them with a long code pseudorandom noise sequence;

a switching means, connected to the channel encoder and scrambler means, for switching the voice data into three base station sectors under control of a base station controller;

a plurality of Walsh sequence covers, connected to the switching means, for covering the voice data with a Walsh sequence;

a summing means for summing a plurality of Walsh covered data from the plurality of Walsh sequence covers; and a base band Quaternary Phase Shift Keying (QPSK) modulating circuit for QPSK spreading multilevel output data from the summing means and modulating them with carrier signals, the base band Quaternary Phase Shift Keying (QPSK) modulating circuit including a binary-multilevel Exclusive-ORing means for Exclusive-ORing the multilevel output data from the summing means and a Pilot pseudorandom noise sequence.

6. A base band modulator for a CDMA digital mobile communication system according to claim 5, wherein the Walsh sequence covers include a plurality of Modulo-2 adders.

7. A base band modulator for a CDMA digital mobile communication system according to claim 5, wherein the base band Quaternary Phase Shift Keying (QPSK) modulating circuit further includes:

a finite impulse response (FIR) filtering means, connected to the binary-multilevel Exclusive-ORing means, for FIR filtering the output signal of the binary-multilevel Exclusive-ORing means.

8. A base band modulator for a CDMA digital mobile communication system according to claim 5, wherein the binary-multilevel Exclusive-ORing means includes:

a subtractor means having one input to which the multilevel output data from the summing means are applied and one input to which a maximum logic level of the multilevel output data from the summing means is applied; and a selecting means having one input to which the multilevel output data from the summing means are applied, one input to which the output signal of the subtractor means is applied, and one input to which a binary logic value from the Pilot pseudorandom noise sequence is applied, and which selects and outputs one of the multilevel output data from the summing means and the output signal from the subtractor means, depending on the binary logic value from the Pilot pseudorandom noise sequence.

9. An improved spread-spectrum modulator in which an input signal is spread using a pseudorandom noise sequence having binary values, wherein the improvement comprises:

the input signal is a multilevel logic signal having a maximum logic value and a plurality of further logic values that are lower than the maximum logic value; and the modulator includes means for subtracting the input signal from the maximum logic value to provide a difference signal, and means for selecting one of the input signal and the difference signal depending on the binary values of the pseudorandom noise sequence.

10. The modulator of claim 9, in combination with means for modulating an output signal from the means for selecting with a carrier signal.

11. The modulator of claim 9, wherein the multilevel logic signal has around sixty four logic values.

* * * * *